(12) United States Patent
Park

(10) Patent No.: US 7,636,341 B2
(45) Date of Patent: Dec. 22, 2009

(54) BEACON SCHEDULING METHOD IN WIRELESS SENSOR NETWORK SYSTEM

(75) Inventor: Jong-hun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 731 days.

(21) Appl. No.: 11/271,886

(22) Filed: Nov. 14, 2005

(65) Prior Publication Data

US 2006/0104251 A1    May 18, 2006

Related U.S. Application Data

(60) Provisional application No. 60/627,404, filed on Nov. 12, 2004.

(30) Foreign Application Priority Data

Sep. 1, 2005    (KR) ...................... 10-2005-0081461

(51) Int. Cl.
*H04Q 7/20* (2006.01)
(52) U.S. Cl. ...................... 370/338; 370/350
(58) Field of Classification Search ................ 370/338, 370/350, 310, 328
See application file for complete search history.

(56) References Cited

U.S. PATENT DOCUMENTS

| 5,940,765 | A * | 8/1999 | Haartsen ...................... 455/462 |
| 2003/0137970 | A1* | 7/2003 | Odman ........................ 370/350 |
| 2004/0022219 | A1* | 2/2004 | Mangold et al. ............. 370/336 |
| 2004/0208152 | A1* | 10/2004 | Perkins et al. .............. 370/338 |
| 2005/0047428 | A1* | 3/2005 | Park et al. .................... 370/445 |
| 2005/0174953 | A1* | 8/2005 | Ho .............................. 370/310 |
| 2005/0185669 | A1* | 8/2005 | Welborn et al. ............. 370/465 |
| 2006/0104241 | A1* | 5/2006 | Kim ............................ 370/329 |
| 2006/0104250 | A1* | 5/2006 | Oh et al. ..................... 370/338 |

OTHER PUBLICATIONS

Venkatesh, Rajendran, et al.: "Energy-Efficient, Collision-Free Medium Access Control fir Wireless Sensor Networks", Proceedings of International Conference on Embedded Network Sensor Systems-(SenSys), Department of Computer Engineering, University of California, Santa Cruz, Nov. 5-7, 2003, pp. 181-192.

* cited by examiner

*Primary Examiner*—Min Jung
(74) *Attorney, Agent, or Firm*—Sughrue Mion, PLLC

(57) ABSTRACT

A beacon scheduling method is provided which can efficiently avoid beacon collisions and prevent power consumption of the router due to the unnecessary beacon transmissions. The beacon scheduling method of a router in a network system including at least one coordinator which sends beacons in a cycle and at least one router, includes sending a message to the router; receiving a reply message from the router; and determining a beacon transmission time of the router to an inactive period when the inactive period is secured in a beacon cycle of the coordinator.

19 Claims, 2 Drawing Sheets

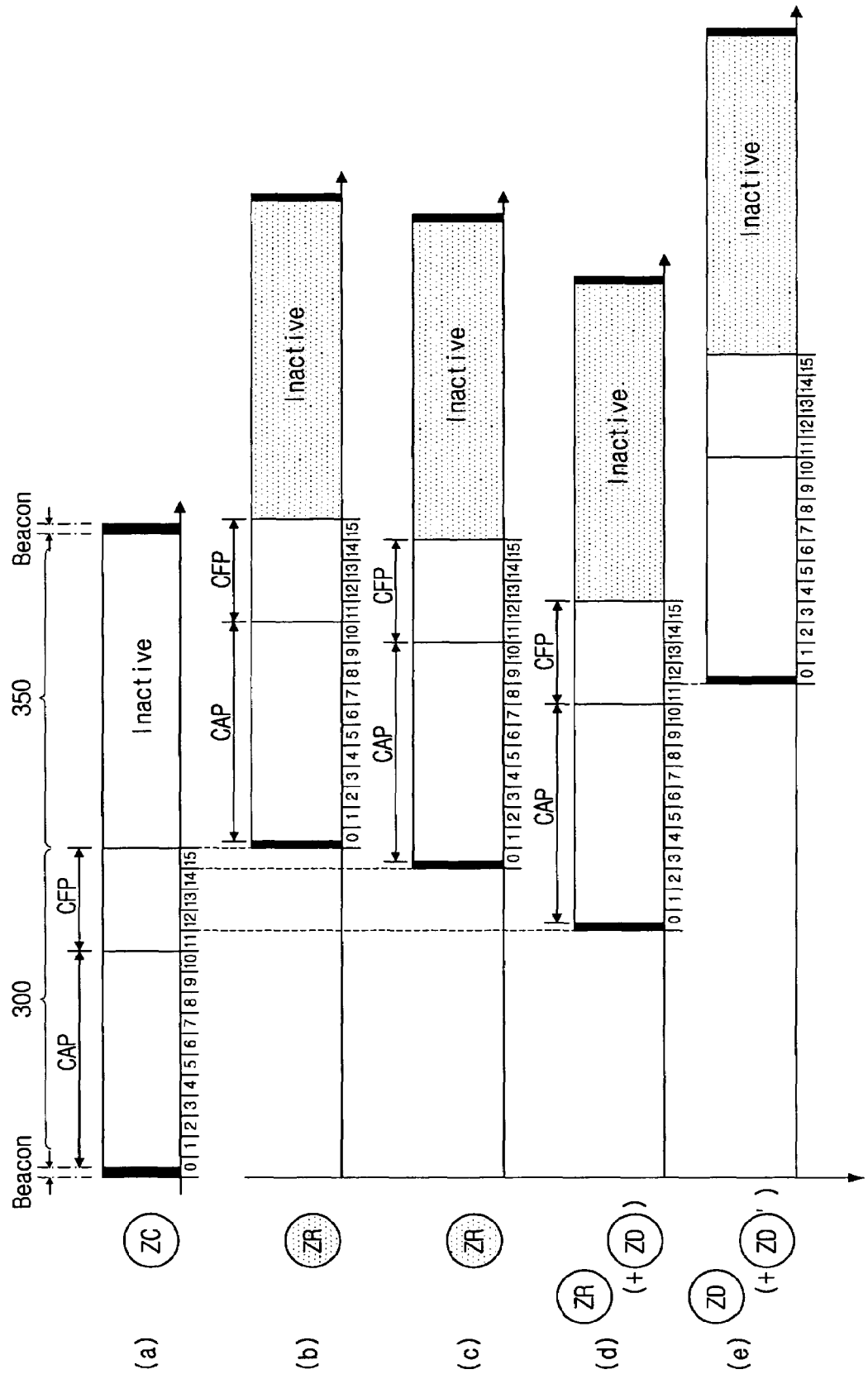

BEACON SCHEDULING METHOD IN WIRELESS SENSOR NETWORK SYSTEM

CROSS-REFERENCE TO RELATED APPLICATION

This application claims the benefit under 35 U.S.C. §119(e) of U.S. Provisional Application No. 60/627,404 filed on Nov. 12, 2004 in the United States Patent and Trademark Office, and priority from Korean Patent Application No. 2005-81461 filed on Sep. 1, 2005 in the Korean Intellectual Property Office, the entire disclosures of which are incorporated herein by reference.

BACKGROUND OF THE INVENTION

1. Field of the Invention

Methods and apparatuses consistent with the present invention relate to a beacon scheduling in a network system. More particularly, the present invention relates to a beacon scheduling method of a router in a network system to prevent beacon conflict.

2. Description of the Related Art

In a ZigBee network topology, nodes in a network system are divided into a ZigBee coordinator (ZC), a ZigBee router (ZR), and a ZigBee device (ZD).

The ZC is on the top of a tree structure and responsible for managing the tree. The ZR is below the ZC and responsible for relaying a beacon transmitted from the ZC to its children (i.e., ZDs) so that the tree structure can be expanded.

The ZD is at the bottom of the network topology. The ZD synchronizes using the beacon transmitted from the ZR and the ZC, and performs communications.

To form such a tree structure, ZRs need to relay beacons received from ZCs to their children. At this time, if the ZRs randomly select a transmission time of the beacons, the beacons are subject to collisions at the child. These beacon collisions block the communications between the nodes.

SUMMARY OF THE INVENTION

The present invention provides a beacon scheduling method of a router in a network system to avoid beacon collisions.

According to an aspect of the present invention, there is provided a beacon scheduling method of a router in a network system including at least one coordinator which sends beacons in a cycle and at least one router, includes sending a message to the router; receiving a reply message from the router; and determining a beacon transmission time of the router as an inactive period in a beacon cycle of the coordinator.

The determining to the inactive period may include adjusting a length of at least one of the beacon cycle and an active period in the beacon cycle.

The beacon scheduling method may further include determining the beacon transmission time of the router to a time period closest to the inactive period when the inactive period is not sufficient in the beacon cycle of the coordinator.

The beacon scheduling method may further include sending the beacons when the router checks a transmission channel status over a predetermined time from the beacon transmission time and determines that the transmission channel status is good.

The beacon scheduling method may further include sending beacons in the time period closest to the inactive period of the beacon cycle of the coordinator when the router checks a transmission channel status over a predetermined time from the beacon transmission time and determines that the transmission channel status is not good.

The reply message may contain information relating to the router.

The information may include whether the router is supplied with power from external sources.

The router may be supplied with power from external sources.

The beacon scheduling method may further include checking using the reply message whether the router is supplied with power from external sources.

The time period may be in a contention free period (CFP).

According to an aspect of the present invention, there is provided a beacon scheduling method of a router in a network system including at least one coordinator which sends beacons in a cycle, at least one router, and at least one device, includes receiving a beacon from the coordinator; receiving a message from the device; sending a beacon to the device in a time period which is selected based on beacon information received from the coordinator; and determining the selected time period as a beacon transmission time period of the router when a reply message is received from the device.

The beacon scheduling method may further include checking information relating to a beacon cycle of the coordinator using the beacon received from the coordinator.

The selected time period may be in an active period of the beacon cycle of the coordinator.

The time period may be arbitrarily selected from time period in a CFP.

The router may not be supplied with power from external sources.

The beacon scheduling method may further include confirming no beacon collision in the selected time period when the reply message is received from the device.

The beacon scheduling method may further include sending information relating to the selected time period to the coordinator.

The beacon scheduling method may further include approving the selected time period by the coordinator.

There may be seven time period in the CFP.

BRIEF DESCRIPTION OF THE DRAWINGS

The above and/or other aspects of the invention will become apparent and more readily appreciated from the following description of exemplary embodiments, taken in conjunction with the accompanying drawing figures of which:

FIG. 2 shows diagrams for explaining a beacon transmission time determination method by the router according to an exemplary embodiment of the present invention.

DETAILED DESCRIPTION OF EXEMPLARY EMBODIMENTS OF THE PRESENT INVENTION

Figure 1:
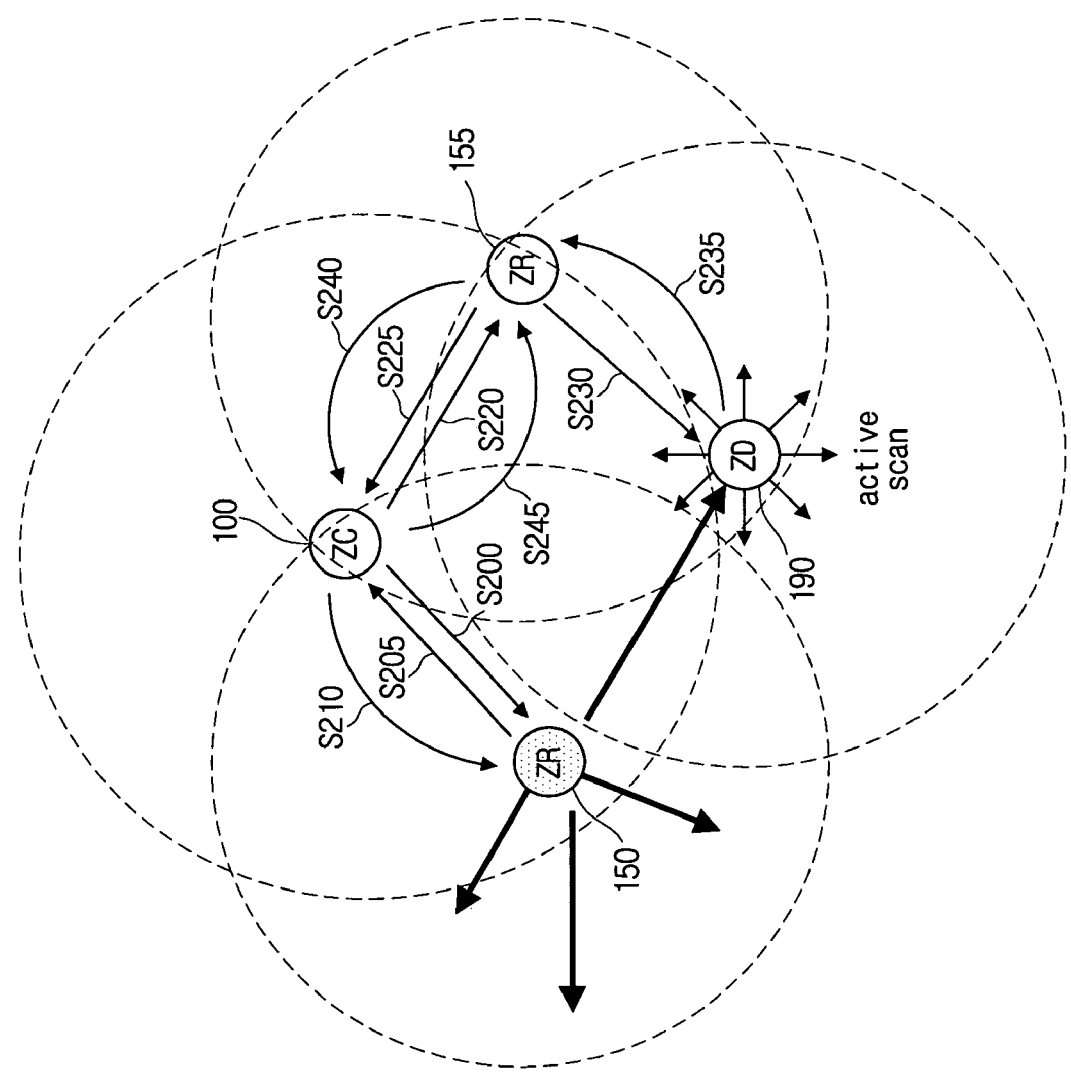
FIG. 1 is a schematic diagram of a network system according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention.

Also, well-known functions or constructions are not described in detail since they would obscure the invention in unnecessary detail.

FIG. 1 is a schematic diagram of a network system according to an exemplary embodiment of the present invention.

According to an exemplary embodiment of the present invention, the network system includes a ZC 100, ZRs 150 and 155, and a ZD 190. In FIG. 1, the first ZR 150 is supplied with power from an external source, and the second ZR 155 is not supplied with power from an external source.

The ZC 100, which joins the network as a router, forms a personal area network (PAN) as a coordinator when it confirms that there are no neighbor nodes by scanning its surroundings.

When joining the PAN formed by the ZC 100, the first ZR 150 receives a beacon message from the ZC 100 (S200). Upon receiving the beacon message, the first ZR 150 sends a reply message to the ZC 100 (S205). The ZC 100 determines a beacon transmission time of transmitting a beacon from the first ZR 150 to a child of the first ZR 150 based on information relating to the first ZR 150 which is contained in the reply message.

The method of determining the beacon transmission time of the first ZR 150 is explained below.

FIG. 2 depict the beacon transmission time determination method of the ZR according to an exemplary embodiment of the present invention. Referring now to FIG. 1 and FIG. 2, the beacon transmission time determination method of the first ZR 150 is explained in detail. The information relating to the first ZR 150, which is contained in the reply message transmitted from the first ZR 150 to the ZC 100, indicates that the first ZR 150 is supplied with the power from an external source.

Thus, the ZC 100 can confirm that the first ZR 150 is supplied with the power from an external source. Next, the ZC 100 checks information relating to its beacon cycle to determine a beacon transmission time from the first ZR 150 to its child.

In FIG. 2, diagram (a) depicts information relating to the beacon cycle of the ZC 100. The beacon cycle of the ZC 100 includes an active period 300 and an inactive period 350. The active period 300 consists of a contention access period (CAP) and a contention free period (CFP).

The ZC 100 first determines the beacon transmission time from the first ZR 150 to a child of the first ZR to be a time period within the inactive period 350. Characteristics of the beacon cycle of the first ZR 150 are shown in diagram (b) of FIG. 2, wherein the beacon transmission time is set to a time period 0 in the inactive period within the beacon cycle of the ZC 100.

If the ZC 100 determines that the inactive period 350 is not sufficient to be the beacon transmission time, the beacon cycle of the ZC 100 can be extended or the length of the active period 300 can be adjusted to attain a sufficient inactive period 350 for the beacon transmission time.

When the extension of the beacon cycle of the ZC 100 or the adjustment of the length of the active period 300 cannot provide the sufficient inactive period 350 for the beacon transmission time, the ZC 100 determines the beacon transmission time within the active period 300.

Since the active period 300 consists of the CAP and the CFP as mentioned early, the ZC 100 determines the beacon transmission time of the first ZR 150 to be one of time periods in the CFP. It is preferred that seven time periods are present in the CFP. The ZC 100 may determine the beacon transmission time of the first ZR 150 to be the time period 150 closest to the inactive period 350 among the time periods of the CFP when the inactive period 350 is insufficient for the beacon transmission time.

In case that the time period 15 closest to the inactive period 350 is assigned to another ZR as its beacon transmission time, the next time period 14 closest to the inactive period 350 is determined to be the beacon transmission time of the first ZR 150. As such, the ZC 100 determines the beacon transmission time of the ZR 150 to its child according to the order of the time periods closest to the inactive period 350 within the CFP.

After determining the beacon transmission time of the first ZR 150, the ZC 100 sends a message containing the determined beacon transmission time to the first ZR 150 (S210). The first ZR 150 checks the status of its beacon transmission channel over a predetermined time period after the determined transmission time.

Upon determining that the channel status is satisfactory over the predetermined time period, the first ZR 150 initiates its beacon transmission. Afterwards, the first ZR 150 periodically transmits its beacon at the transmission time determined by the ZC 100.

In the exemplary embodiment of the present invention, the predetermined time period when the channel status is checked is a carrier sense multiple access—collision avoidance (CSAM-CA) backoff period. When the present invention is applied to a ZigBee system, the predetermined time can be 20 symbols.

Conversely, upon determining that the channel status is not satisfactory over the predetermined time, the first ZR 150 determines the time period closest to the inactive period 350 in the beacon cycle of the ZC 100 as its beacon transmission time.

In this case, the first ZR 150 also checks its beacon transmission channel status over a predetermined time from the new transmission time.

Upon determining that the channel status is satisfactory over the predetermined time, the first ZR 150 initiates its beacon transmission. Afterwards, the first ZR 150 periodically transmits its beacon at the new transmission time determined by the ZC 100.

By contrast, upon determining that the channel status is not good over the predetermined time, the first ZR 150 determines the next time period closest to the inactive period 350 in the beacon cycle of the ZC 100 as its beacon transmission time.

Diagram (c) of FIG. 2 shows that the beacon transmission time of the first ZR 150 is set to the time period closest to the inactive period 350 (i.e., time period 15) in the beacon cycle of the ZC 100 as described above. Afterwards, the first ZR 150 periodically transmits its beacons at the determined beacon transmission time.

Likewise, the first ZR 150 repeats the beacon transmission even when there are no other ZRs or devices under the first ZR 150. This is not problematic for a ZR (the first ZR 150) which is supplied with power from external sources. However, it is inefficient in a long term view since a ZR which is not supplied with power from external sources is likely to consume a great deal of power to transmit beacons.

The present invention may be applied to the ZR which is not supplied with power from external sources in spite of the inefficiency. It is preferable to apply the following method in a ubiquitous environment where the low power of the sensor network is a requirement.

Referring back to FIG. 1, when the second ZR 155 joins the PAN formed by the ZC 100, the second ZR 155 first receives a beacon message from the ZC 100 (S220). Upon receiving the beacon message, the second ZR 155 sends a reply message to the ZC 100. The ZC 100 confirms that the second ZR 155 is not supplied with power from external sources, based on information relating to the second ZR 155 that is contained in the reply message.

Next, the ZC 100, similar to the first ZR 150, does not determine a beacon transmission time of a child node. Instead, the second ZR 155 determines its beacon transmission time.

The following describes how the second ZR 155 determines the beacon transmission time in detail. The second ZR 155 waits without consuming the power until the new ZD 190 joins as its child.

The ZD 190, which joins the PAN of the ZC 100, broadcasts a beacon request message through the active scanning. The second ZR 155, upon receiving the broadcast message from the ZD 190, determines its beacon transmission time.

The second ZR 155 checks the information relating to the beacon cycle of the ZC 100 using the beacon message received from the ZC 100 in advance, and selects its beacon transmission time from the time periods in the CFP within the active period 300 of the beacon cycle of the ZC 100.

When selecting the beacon transmission time from the time periods within the CFP, the second ZR 155 may exclude any time periods assigned to other ZRs which are the children of the ZC 100. Also, the transmission time may be randomly selected from the time periods of the CFP.

Next, the second ZR 155 sends its beacon to the ZD 190 in the time period selected as explained above (S230).

When the ZD 190 does not send a connection request message to the second ZR 155 over a predetermined time by the beacon in response to the beacon request message from the ZD 190, the second ZR 155 does not serve as the router (beacon transmission) any more but only acts as the ZD of the parent ZC 100.

Upon receiving the connection request message (the reply message) from the ZD 190, the second ZR 155 can confirm that there is no beacon collision at the ZD 190 when the ZR 155 sends the beacon in the selected time period.

In this case, the second ZR 155 determines the selected time period as its beacon transmission time period, and sends to the ZC 100 the information relating to the determined beacon transmission time period (S240).

The ZC 100, receiving the information relating to the determined beacon transmission time period, checks whether the determined time period is assigned to another ZR which is its child. When the determined time period is not assigned to another ZR, the ZC 100 confirms the improbability of the beacon collision and approves the determined time period as the beacon transmission time of the second ZR 155.

Next, the ZC 100 sends an approval message to the second ZR 155 (S245). Upon receiving the approval message, the second ZR 155 periodically sends its beacons according to the determined beacon transmission time period.

Diagram (d) of FIG. 2 depicts that the beacon transmission time of the second ZR 155 is set to an arbitrary time period in the CFP of the beacon cycle of the ZC 100.

According to an exemplary embodiment of the present invention, the ZD 190 may function as the ZR. The ZD 190 acting as the ZR may not be supplied with power from external sources, and another ZD may join as the child of the ZD 190.

In this situation, to determine the beacon transmission time of the ZD 190, it is necessary to take account of the information relating to the beacon cycle of the second ZR 155 that is the parent of the ZD 190. Specifically, the ZD 190 selects an arbitrary time period in the CFP of the beacon cycle of the second ZC 155 (e.g., time period 12) in order to determine its beacon transmission time. The selected time period is set to the beacon transmission time of the ZD 190 through the procedure as explained above.

Diagram (e) of FIG. 2 depicts that the beacon transmission time of the ZD 190 acting as the ZR is set to an arbitrary time period (e.g., time period 12) in the CFP of the beacon cycle of the second ZR 155.

The beacon scheduling method by the second ZR 155 is applicable to a ZR which is supplied with power from external sources.

As set forth above, the present invention can efficiently avoid the beacon collision and prevent the power consumption of the ZR due to the unnecessary beacon transmissions.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A beacon scheduling method of a router in a network system including at least one coordinator which sends beacons in a cycle and at least one router, the method comprising:
   sending at one of the at least one coordinator a message to one of the at least one router;
   receiving at the one coordinator a reply message from the one router; and
   determining at the one coordinator, based on information included in the reply message and a length of an inactive period of a beacon cycle of the one coordinator, a beacon transmission time of a beacon sent from the one router with respect to the beacon cycle of the one coordinator.

2. The beacon scheduling method of claim 1, wherein the determining of the beacon transmission time comprises:
   determining whether the inactive period of the beacon cycle is sufficient for the beacon transmission time;
   if the inactive period is sufficient, setting the beacon transmission time to be a time period in the inactive period; and
   if the inactive period is not sufficient, adjusting a length of at least one of the beacon cycle and an active period of the beacon cycle.

3. The beacon scheduling method of claim 2, wherein the determining of the beacon transmission time comprises determining the beacon transmission time of the one router to be a time period closest to the inactive period if the inactive period is not sufficient.

4. The beacon scheduling method of claim 3, further comprising:
   transmitting at the one coordinator a message containing the beacon time frame which is determined to the one router;
   checking at the one router a transmission channel status over a predetermined time period after the beacon transmission time; and
   transmitting the beacons from the one router if it is determined that the transmission channel status is satisfactory.

5. The beacon scheduling method of claim 4, further comprising transmitting the beacons from the one router in a time period of the active period which is closest to the inactive period if it is determined that the transmission channel status is not satisfactory.

6. The beacon scheduling method of claim 3, wherein the time period is in a contention free period of the beacon cycle of the one coordinator.

7. The beacon scheduling method of claim 1, wherein the information included in the reply message includes information related to the one router.

8. The beacon scheduling method of claim 7, wherein the information indicates whether the one router is supplied with power from an external source.

9. The beacon scheduling method of claim 7, wherein the information indicates that the one router is supplied with power from an external source.

10. beacon scheduling method of claim 1, further comprising determining at the one coordinator whether the one router is supplied with power from an external source, based on the reply message.

11. A beacon scheduling method of a router in a network system including at least one coordinator which sends beacons in a cycle, at least one router, and at least one device, the method comprising:
   receiving at one of the at least one router a beacon from one of the at least one coordinator;
   receiving at the one router a message from one of the at least one device;
   sending at the one router a beacon to the one device in a time period which is selected based on beacon information received from the one coordinator; and
   determining at the one router the time period as a beacon transmission time period of the one router when a reply message in response to the beacon sent by the one router is received from the one device.

12. The beacon scheduling method of claim 11, further comprising checking at the one router information relating to a beacon cycle of the one coordinator using the beacon received from the one coordinator.

13. The beacon scheduling method of claim 11, wherein the time period is in an active period of the beacon cycle of the one coordinator.

14. The beacon scheduling method of claim 11, wherein the time period is arbitrarily selected from time period in a contention free period (CFP).

15. The beacon scheduling method of claim 14, wherein there are seven time period in the CFP.

16. The beacon scheduling method of claim 11, wherein the one router is not supplied with power from an external source.

17. The beacon scheduling method of claim 11, further comprising confirming no beacon collision occurred in the time period if the reply message is received from the one device.

18. The beacon scheduling method of claim 11, further comprising sending information relating to the time period to the one coordinator.

19. The beacon scheduling method of claim 18, further comprising approving the selected time period by the one coordinator.

* * * * *